(12) United States Patent
Nakashima (10) Patent No.: US 11,970,237 B2
(45) Date of Patent: Apr. 30, 2024

(54) DRIVING DEVICE AND DRIVING SYSTEM

(71) Applicant: Shimano Inc., Osaka (JP)

(72) Inventor: Yasuhiro Nakashima, Osaka (JP)

(73) Assignee: Shimano Inc., Osaka (JP)

( * ) Notice: Subject to any disclaimer, the term of this patent is extended or adjusted under 35 U.S.C. 154(b) by 706 days.

(21) Appl. No.: 16/416,695

(22) Filed: May 20, 2019

(65) Prior Publication Data

US 2019/0359282 A1 Nov. 28, 2019

(30) Foreign Application Priority Data

May 23, 2018 (JP) ................................. 2018-099128

(51) Int. Cl.
| | | |
|---|---|---|
| *B62K 23/06* | (2006.01) | |
| *B62J 43/13* | (2020.01) | |
| *B62J 45/00* | (2020.01) | |
| *B62L 3/02* | (2006.01) | |

(52) U.S. Cl.
CPC ............... *B62K 23/06* (2013.01); *B62J 43/13* (2020.02); *B62J 45/00* (2020.02); *B62L 3/023* (2013.01)

(58) Field of Classification Search
CPC ....................................................... B62J 43/13
See application file for complete search history.

(56) References Cited

U.S. PATENT DOCUMENTS

| | | | |
|---|---|---|---|
| 2006/0113836 A1 | 6/2006 | Nakamura | |
| 2009/0195060 A1* | 8/2009 | Nishikawa | ............ B60T 8/3225 |
| | | | 303/116.1 |
| 2011/0266106 A1 | 11/2011 | Suzuki | |
| 2013/0180815 A1 | 7/2013 | Dunlap et al. | |
| 2016/0061279 A1* | 3/2016 | Kariyama | ............... B60T 7/085 |
| | | | 701/70 |

FOREIGN PATENT DOCUMENTS

| | | |
|---|---|---|
| CN | 103661762 A | 3/2014 |
| CN | 106458185 A | 2/2017 |
| DE | 10 2009 006 698 A1 | 9/2009 |
| DE | 10 2013 213 381 A1 | 1/2014 |
| EP | 1 873 029 B1 | 1/2013 |
| JP | 2002-87370 A | 3/2002 |
| JP | 2005-297777 A | 10/2005 |
| JP | 2006-151248 A | 6/2006 |
| JP | 2009-179269 A | 8/2009 |
| JP | 2010-38169 A | 2/2010 |
| JP | 2010-149798 A | 7/2010 |
| JP | 2017-43332 A | 3/2017 |

* cited by examiner

*Primary Examiner* — Vicky A Johnson
(74) *Attorney, Agent, or Firm* — Global IP Counselors, LLP (57) ABSTRACT

A driving device is use in a small vehicle including a bicycle. The driving device includes an electric drive mechanism, a transmission, and a switching mechanism. The electric drive mechanism includes an electric motor that is configured to drive a movable member. The transmission is configured to transmit power from an operating portion to the movable member. The switching mechanism is configured to switch a state of the driving device between a first state in which the movable member is driven by power of the electric motor and a second state in which the movable member is driven by power from the operating portion.

19 Claims, 7 Drawing Sheets

DRIVING DEVICE AND DRIVING SYSTEM

CROSS-REFERENCE TO RELATED APPLICATIONS

This application claims priority to Japanese Patent Application No. 2018-099128, filed on May 23, 2018. The entire disclosure of Japanese Patent Application No. 2018-099128 is hereby incorporated herein by reference.

BACKGROUND

Technical Field

The present invention generally relates to a driving device and a driving system.

Background Information

A small vehicle including a bicycle is provided with a brake system that includes an electric drive mechanism. For example, United States Patent Application Publication No. 2013/0180815 (Patent Literature 1) describes an example of the brake system that includes the electric drive mechanism.

SUMMARY

It is desired that a state of driving a movable member by the electric drive mechanism and a state of driving the movable member by human power should be switched.

The present invention has been made to solve the above-described problem and has an object to provide a driving device and a driving system that are capable of switching between a state of driving a movable member by an electric drive mechanism and a state of driving the movable member by human power.

To achieve the object above-described, in accordance with a first aspect, a driving device for use in a small vehicle including a bicycle. The driving device comprises an electric drive mechanism, a transmission, and a switching mechanism. The electric drive mechanism includes an electric motor that is configured to drive a movable member. The transmission is configured to transmit power from an operating portion to the movable member. The switching mechanism is configured to switch a state of the driving device between a first state in which the movable member is driven by power of the electric motor and a second state in which the movable member is driven by power from the operating portion. With the driving device according to the first aspect, it is possible to switch between the first state of driving the movable member by the electric drive mechanism and the second state of driving the movable member by human power.

In accordance with a second aspect, in the driving device according to the first aspect, the transmission operatively couples the electric drive mechanism to the movable member to transmit the power from the electric drive mechanism to the movable member via the transmission. With the driving device according to the second aspect, the transmission can serve as both the flow path that transmits the power from the operating portion to the movable member and the flow path that transmits the power from the electric drive mechanism to the movable member. Thus, the driving device can be configured to be compact.

In accordance with a third aspect, the driving device according to the first or second aspect further comprises a signal generator, an additional transmission, and a drive controller. The signal generator is configured to generate a control signal based on the power from the operating portion. The additional transmission is configured to transmit the power from the operating portion to the signal generator. The drive controller is configured to control the electric motor based on the control signal. The switching mechanism is configured to selectively transmit the power from the operating portion to either one of the transmission and the additional transmission. With the driving device according to the third aspect, by driving the movable member based on the power from the operating portion in either of the first state and the second state, it is possible to give a user the same operational feeling in either of the first state and the second state.

In accordance with a fourth aspect, in the driving device according to the third aspect, the switching mechanism includes an electric actuator, and the driving device further comprises a switching controller configured to control the electric actuator. With the driving device according to the fourth aspect, it is possible to smoothly switch between the first state and the second state.

In accordance with a fifth aspect, in the driving device according to the fourth aspect, the switching controller is configured to control the electric actuator based on a result of comparison between electric power supplied to the electric motor and a prescribed threshold. With the driving device according to the fifth aspect, it is possible to switch between the first state and the second state if abnormality occurs in electric power supplied to the electric motor.

In accordance with a sixth aspect, in the driving device according to the fifth aspect, the switching controller is configured to control the electric actuator such that the power from the operating portion is transmitted to the additional transmission upon determining the electric power supplied to the electric motor is greater than or equal to the prescribed threshold. With the driving device according to the sixth aspect, it is possible to switch between the first state and the second state if abnormality occurs in electric power supplied to the electric motor.

In accordance with a seventh aspect, in the driving device according to the sixth aspect, the switching controller is configured to control the electric actuator such that the power from the operating portion is transmitted to the transmission upon determining the electric power supplied to the electric motor is lower than the prescribed threshold. With the driving device according to the seventh aspect, the driving device goes into the second state if abnormality occurs in the electric power supplied to the electric motor, and the movable member can be driven by human power.

In accordance with an eighth aspect, in the driving device according to the seventh aspect, the electric actuator includes a moving member configured to move between a first position corresponding to the first state and a second position corresponding to the second state. With the driving device according to the eighth aspect, it is possible to implement the first state and the second state, by moving a single moving member. Thus, the driving device can be configured simply.

In accordance with a ninth aspect, in the driving device according to the eighth aspect, the electric actuator is configured to cause the moving member to move from the second position to the first position with supply of the electric power. With the driving device according to the ninth aspect, the driving device goes into the second state if abnormality occurs in the electric power supplied to the electric motor, and the movable member can be driven by human power.

In accordance with a tenth aspect, in the driving device according to the eighth or ninth aspect, the switching mechanism further comprises a biasing member configured to bias the moving member toward the second position. With the driving device according to the tenth aspect, the driving device goes into the second state if abnormality occurs in the electric power supplied to the electric motor, and the movable member can be driven by human power.

In accordance with an eleventh aspect, in the driving device according to any one of the third to tenth aspects, the transmission includes a flow path through which hydraulic pressure is transmitted, and the additional transmission includes an additional flow path through which hydraulic pressure is transmitted. With the driving device according to the eleventh aspect, by driving the movable member based on the hydraulic pressure in either of the first state and the second state, it is possible to give a user the same operational feeling in either of the first state and the second state.

In accordance with a twelfth aspect, in the driving device according to any one of the third to tenth aspects, the transmission includes at least one gear, and the additional transmission includes at least one gear. With the driving device according to the twelfth aspect, it is possible to switch between the first state and the second state, by the rotation of the gears.

In accordance with a thirteenth aspect, the driving device according to any one of the third to twelfth aspects further comprises a housing in which the transmission, the additional transmission, and the switching mechanism are provided. With the driving device according to the thirteenth aspect, the driving device can be configured to be compact.

To achieve the above-described object, in accordance with a fourteenth aspect, a driving system includes an operating device, an operated device, and the driving device according to any one of the first to thirteenth aspects. The operating device includes the operating portion. The operated device is configured to be operated in accordance with an input to the operating portion. The driving device is provided in either one of the operating device and the operated device. With the driving system according to the fourteenth aspect, it is possible to switch between the first state and the second state.

In accordance with a fifteenth aspect, the driving system according to the fourteenth aspect further comprises an additional operated device arranged at a position different from a position of the operated device in the small vehicle and driven only by electric power. With the driving system according to the fifteenth aspect, it is possible to brake the small vehicle more easily.

In accordance with a sixteenth aspect, in the driving system according to the fifteenth aspect, the operated device is provided corresponding to a front wheel of the small vehicle, and the additional operated device is provided corresponding to a rear wheel of the small vehicle. With the driving system according to the sixteenth aspect, by providing the operated device including the driving device capable of switching between the first state and the second state, corresponding to the front wheel, the reliability can be improved.

According to the present invention, it is possible to switch between a state of driving a movable member by an electric drive mechanism and a state of driving the movable member only by human power.

BRIEF DESCRIPTION OF THE DRAWINGS

Referring now to the attached drawings which form a part of this original disclosure.

DETAILED DESCRIPTION OF EMBODIMENTS

A preferred embodiment of the present invention will be described in detail with reference to the accompanying drawings. It should be noted that the present invention is not limited by the embodiment. When plural embodiments are available, the present invention encompasses a configuration including a combination of the embodiments. For example, the present embodiment describes a case in which a small vehicle is a bicycle, but the embodiment is applicable to other vehicles driven by human power.

A small vehicle 10 in the present embodiment refers to a vehicle at least partially using human power for motive power for traveling and includes a vehicle using electric power to assist human power. The small vehicle 10 includes a vehicle that does not require a license on a public road. The small vehicle 10 does not include a vehicle solely using motive power other than human power. The small vehicle 10 does not include a vehicle having an internal combustion engine. The small vehicle 10 is a bicycle, for example. The small vehicle 10 may be an electrically assisted bicycle (e-bike). The small vehicle 10 includes a frame 12, a handlebar 14, a saddle 15, a fork 16, a front wheel 20, a rear wheel 22, a battery 24, a power generation mechanism 26, and a driving system 30. In the present embodiment, terms of "front", "rear", "left", "right", "upper", and "lower", as well as the terms with equivalent meaning mean "front", "rear", "left", "right", "upper", and "lower", as viewed in a state where the user, facing the handlebar 14, sits on the saddle 15.

Figure 1:
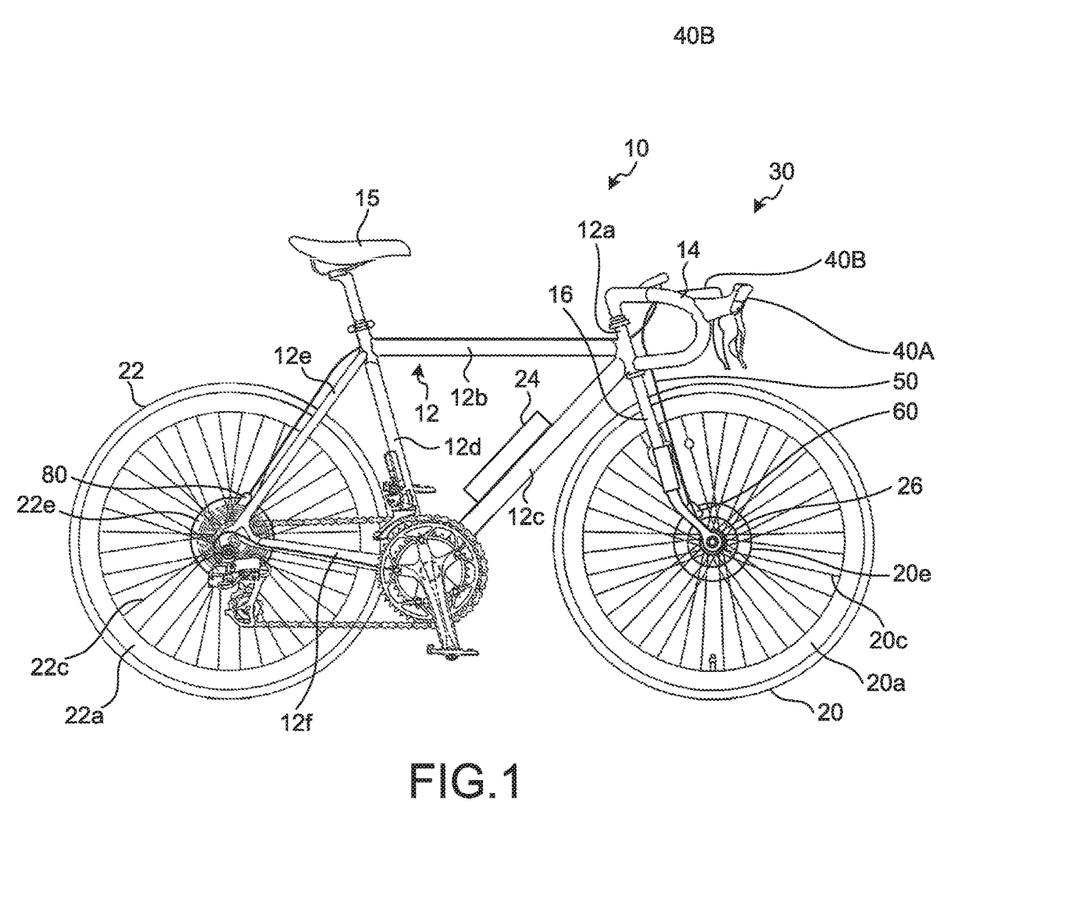
FIG. 1 is a side elevational view of a small vehicle (bicycle) equipped with an operating device that operates an operated device and an additional operating device that operates an additional operated device according to an illustrated embodiment.

As illustrated in FIG. 1, the frame 12 includes a head tube 12a, a top tube 12b, a down tube 12c, a seat tube 12d, a pair of seat stays 12e, and a pair of chain stays 12f. The head tube 12a supports the handlebar 14 and the fork 16 such that they are rotatable. One end of the top tube 12b is connected to the head tube 12a, and the other end is connected to the seat tube 12d. One end of the down tube 12c is connected to the head tube 12a, and the other end is connected to the seat tube 12d. One end of each of a pair of seat stays 12e is connected to the seat tube 12d and the other end is connected to the chain stay 12f. One end of each of a pair of chain stays 12f is connected to the seat tube 12d and the other end is connected to the seat stay 12e. FIG. 1 illustrates the seat stay 12e and the chain stay 12f on the right side.

The handlebar 14 is configured to be gripped by a rider (user) of the small vehicle 10. The handlebar 14 is rotatable relative to the head tube 12a. The handlebar 14 is rotated whereby the fork 16 rotates to change the traveling direction of the small vehicle 10.

As illustrated in FIG. 1, the front wheel 20 is attached to the fork 16 so as to be rotatable. The front wheel 20 includes a rim 20a to which a tire is attached, a plurality of spokes 20c, and a disc rotor 20e. The rear wheel 22 is attached to the rear end where the seat stays 12e are connected with the chain stays 12f. The rear wheel 22 is rotatable relative to the frame 12. The rear wheel 22 includes a rim 22a to which a tire is attached, a plurality of spokes 22c, and a disc rotor 22e.

The battery 24 is a rechargeable battery (secondary battery). As illustrated in FIG. 1, the battery 24 is attached to the down tube 12c, for example. The battery 24 is connected to components of the small vehicle 10 including the driving system 30 to supply electric power to these components.

The power generation mechanism 26 generates electric power by the operation of the small vehicle 10. As illustrated in FIG. 1, the power generation mechanism 26 is provided in the front wheel 20, for example. The power generation mechanism 26 may be provided on the rear wheel 22. The power generation mechanism 26 is a dynamo (hub dynamo) that generates electric power with the rotation of the front wheel 20. The power generation mechanism 26 supplies the generated electric power to the battery 24.

The driving system 30 includes an operating device 40A, an additional operating device 40B, a connecting member 50, an operated device 60, a driving device 70, an additional operated device 80, and an additional driving device 90. The operating device 40A corresponds to the operated device 60. The connecting member 50 mechanically connects the operating device 40A and the operated device 60. The additional operating device 40B corresponds to the additional operated device 80. The additional operating device 40B and the additional operated device 80 are electrically connected by an electric cable and the like. In the present embodiment, each of the operated device 60 and the additional operated device 80 is a disc brake caliper. Each of the operating device 40A and the additional operating device 40B can be configured to be capable of operating a device such as a gear box other than the operated device 60 and the additional operated device 80.

As illustrated in FIG. 1, the operating device 40A and the additional operating device 40B are provided on the handlebar 14. The operating device 40A is provided on one end (right-side end portion, in the present embodiment) of the handlebar 14. The additional operating device 40B is provided on the other end (left-side end portion, in the present embodiment) of the handlebar 14. The operating device 40A is an operating device of a hydraulic brake. The operating device 40A includes a supporting member 41, an operating portion 42, a pivot 44, and a hydraulic unit 46.

Figure 2:
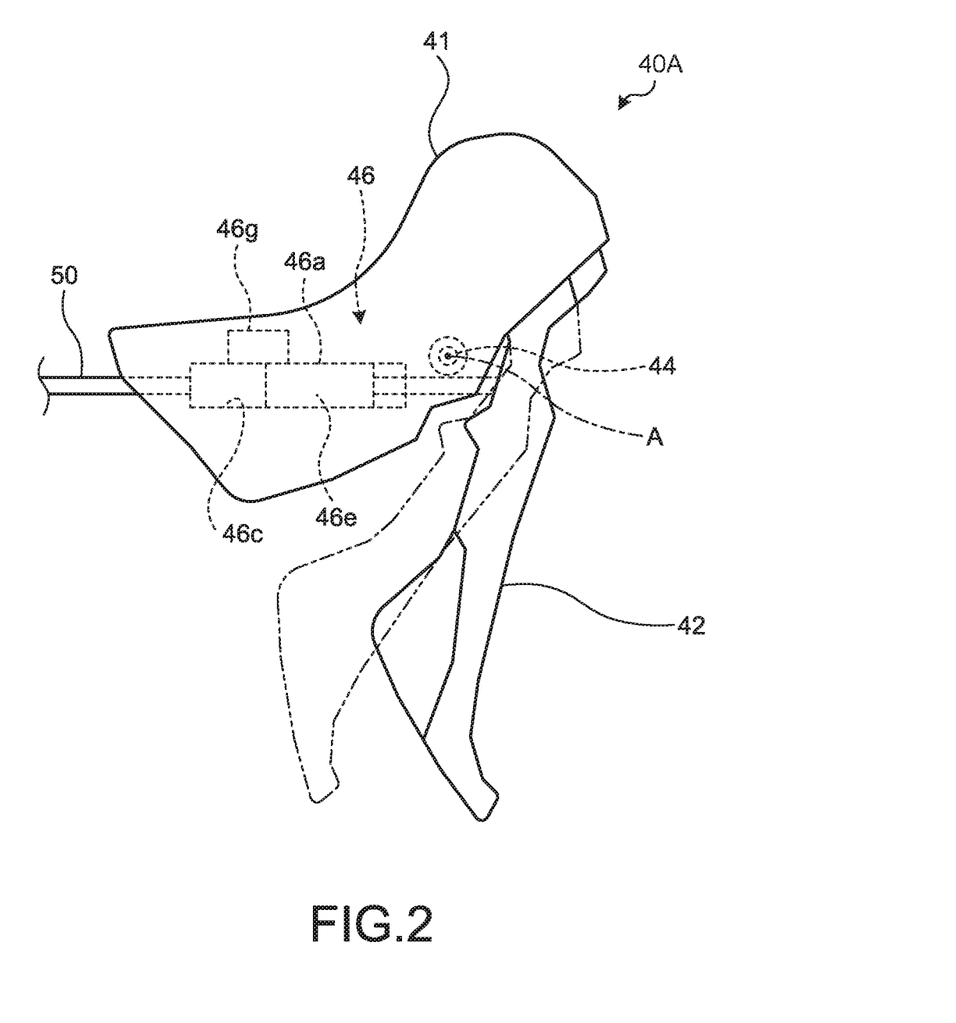
FIG. 2 is a schematic diagram of the operating device in accordance with the illustrated embodiment.

The supporting member 41 is provided on the handlebar 14. The operating portion 42 is provided on the supporting member 41. The operating member 40c is a user operable input device. The operating portion 42 is provided so as to be pivotable around a pivot axis A from a standby position to an operated position. The pivot axis A is a virtual straight line passing through the center of the pivot 44. The operating portion 42 is a brake lever. In FIG. 2, the operating portion 42 is illustrated in the standby position by a solid line. In FIG. 2, the operating portion 42 is illustrated in the operated position by a dashed and double-dotted line. For example, the operating portion 42 is supported with an elastic member. When a force is applied to the operating portion 42 in the standby position, the operating portion 42 moves to the operated position against the elastic force of the elastic member. When the operating portion 42 is released, the operating portion 42 returns to the standby position by the elastic force of the elastic member. Here, in FIG. 2, the standby position is a rest position. The term "rest position" as used herein refers to a state in which a movable part (e.g., the operating member 42) remains stationary without the need of a user or other external force intervening (e.g., holding the operating member 42) to establish a state corresponding to the rest position. Thus, the term "rest position" can also be referred to as a non-operated position. The operated position is not limited to the position illustrated in FIG. 2. The operated position in FIG. 2 is illustrated by way of example.

The hydraulic unit 46 is provided in the supporting member 41. The hydraulic unit 46 includes a base portion 46a, a cylinder hole 46c, a piston 46e, and a reservoir 46g. The base portion 46a is a hollow tubular member. The base portion 46a is provided in the supporting member 41. The cylinder hole 46c is provided in the base portion 46a. The piston 46e is provided so as to be movable in the cylinder hole 46c. The cylinder hole 46c is filled with hydraulic oil. The piston 46e is connected to the operating portion 42. The piston 46e operates in conjunction with the operating portion 42. When the operating portion 42 is swung, the piston 46e moves in the inside of the cylinder hole 46c. The hydraulic oil in the cylinder hole 46c is thus supplied to the operated device 60, so that the front wheel 20 is braked. The reservoir 46g is fluidly coupled to the cylinder hole 46c. That is, the reservoir 46g and the cylinder hole 46c communicate with each other such that the hydraulic oil that is fluid can circulate. The reservoir 46g is provided on the base portion 46a. The reservoir 46g stores therein hydraulic oil to allow the hydraulic oil to circulate between the cylinder hole 46c and the reservoir 46g in accordance with to the position of the piston 46e.

The connecting member 50 is configured to connect the operating device 40A with the operated device 60. The connecting member 50 is a hose. The connecting member 50 is connected to the hydraulic unit 46. The inside of the connecting member 50 is filled with the hydraulic oil that is a power transmission medium. The connecting member 50 transmits a change in hydraulic pressure in the hydraulic unit 46 to the operated device 60.

Figure 3:
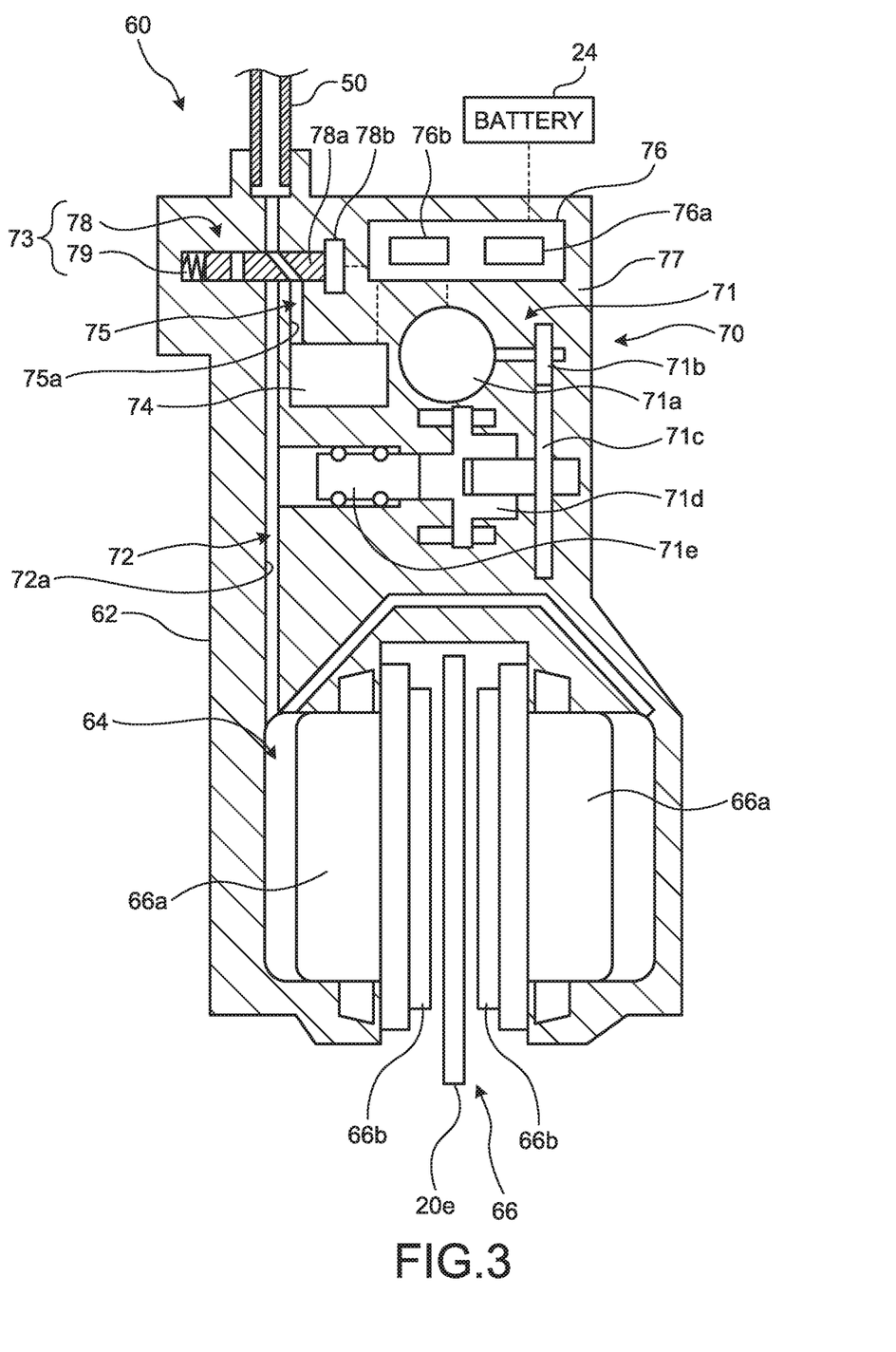
FIG. 3 is a schematic cross-sectional view of the operated device in accordance with the illustrated embodiment in a first state.

The operated device 60 is operated in accordance with the input to the operating portion 42. The operated device 60 is provided corresponding to the front wheel 20 of the small vehicle 10. As illustrated in FIG. 3, the operated device 60 includes a base portion 62, a flow path 64, and a movable member 66. The base portion 62 is provided on the fork 16. The flow path 64 is provided in the base portion 62. The movable member 66 includes pistons 66a and friction members 66b. The pistons 66a are movably provided with respect to the base portion 62. The friction members 66b are brake pads. The friction members 66b are supported on the base portion 62 via a not-illustrated pad pin so as to move with the movement of the pistons 66a.

The driving device 70 is for use in the small vehicle 10 including a bicycle. As illustrated in FIG. 3, the driving device 70 includes an electric drive mechanism 71, a transmission 72, a switching mechanism 73, a signal generator 74, an additional transmission 75, an electronic control unit 76, and a housing 77.

As illustrated in FIG. 3, the electric drive mechanism 71 includes an electric motor 71a, a gear 71b, a gear 71c, a ball screw 71d, and a piston 71e. The electric motor 71a is configured to drive the movable member 66. The electric motor 71a includes a case that is provided in the housing 77, a stator that is provided in the case, and a rotor that rotates with respect to the stator, for example. The electric power from the battery 24 is supplied to the electric motor 71a. The gear 71b is connected to the rotor of the electric motor 71a. The gear 71c meshes with the gear 71b. The ball screw 71d includes a screw shaft connected to the gear 71c, and a nut that meshes with the screw shaft. The piston 71e is connected to the nut of the ball screw 71d. The power of the electric motor 71a is transmitted to the ball screw 71d via the gear 71b and the gear 71c. When the screw shaft is rotated, the nut and the piston 71e move in the shaft direction.

The transmission 72 is configured to transmit the power from the operating portion 42 to the movable member 66. In the present embodiment, the transmission 72 is configured to transmit, from the operating portion 42 to the movable member 66, the hydraulic pressure of the hydraulic oil that is a power transmission medium. As illustrated in FIG. 3, the transmission 72 includes a transmission line forming a flow path 72a through which the hydraulic pressure is transmitted. The piston 71e is provided in a chamber that communicates with the transmission 72. The power (hydraulic pressure) from the electric drive mechanism 71 is transmitted to the movable member 66 via the transmission 72.

The switching mechanism 73 is configured to switch the state of the driving device 70 between a first state in which the movable member 66 is driven by the power (hydraulic pressure) of the electric motor 71a and a second state in which the movable member 66 is driven by the power (hydraulic pressure) from the operating portion 42. The switching mechanism 73 is configured to selectively transmit the power from the operating portion 42 to either one of the transmission 72 and the additional transmission 75. As illustrated in FIG. 3, the switching mechanism 73 includes an electric actuator 78 and a biasing member 79.

Figure 4:
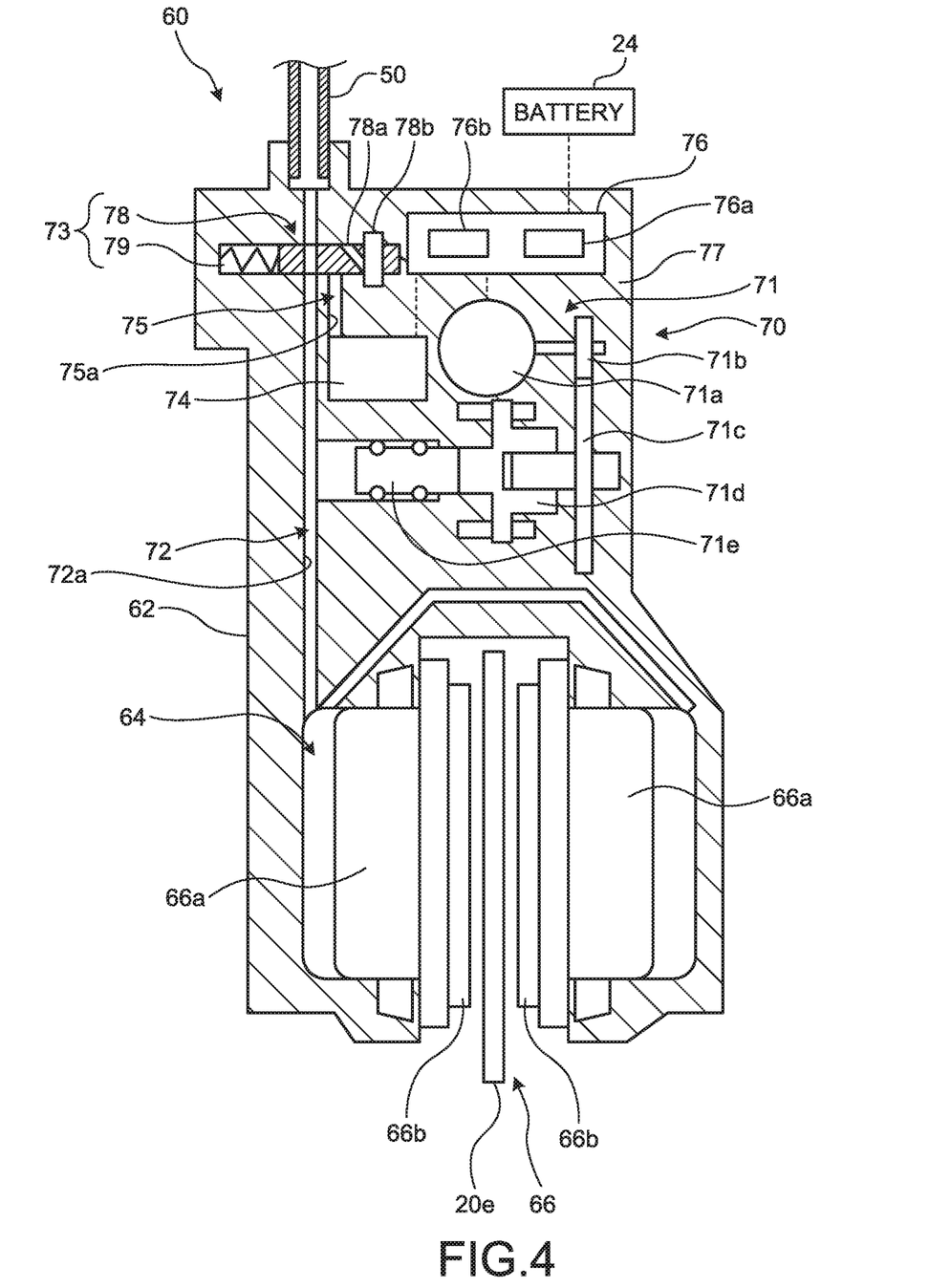
FIG. 4 is a schematic cross-sectional view of the operated device in the accordance with the illustrated embodiment in a second state.

As illustrated in FIG. 3, the electric actuator 78 includes a moving member 78a and a drive portion 78b. The moving member 78a moves between a first position corresponding to the first state and a second position corresponding to the second state. The moving member 78a is movably provided in the housing 77. In FIG. 3, the moving member 78a is at the first position. As illustrated in FIG. 3, when the moving member 78a is at the first position, the connecting member 50 communicates with the additional transmission 75, and the hydraulic pressure from the operating portion 42 is supplied to the signal generator 74. In FIG. 4, the moving member 78a is at the second position. As illustrated in FIG. 4, when the moving member 78a is at the second position, the connecting member 50 communicates with the transmission 72, and the hydraulic pressure from the operating portion 42 is supplied to the flow path 64 and eventually to the movable member 66. The electric actuator 78 is configured to cause the moving member 78a to move from the second position to the first position with the supply of electric power. The drive portion 78b is configured to cause the moving member 78a to move from the second position to the first position with the supply of electric power. The drive portion 78b is a solenoid, for example. The biasing member 79 biases the moving member 78a toward the second position. The biasing member 79 is a coil spring, for example. One end of the biasing member 79 is supported on the housing 77. The other end of the biasing member 79 is in contact with the moving member 78a.

The signal generator 74 generates a control signal based on the power from the operating portion 42. The signal generator 74 is a pressure sensor, for example. The additional transmission 75 is configured to transmit the power from the operating portion 42 to the signal generator 74. The additional transmission 75 includes an additional flow path 75a through which the hydraulic pressure is transmitted. The signal generator 74 changes the control signal to be generated in response to the changes in the hydraulic pressure transmitted from the additional transmission 75. The signal generator 74 outputs the generated control signal to the electronic control unit 76.

The electronic control unit 76 is a microcomputer and includes a central processing unit (CPU), an electronic control unit (ECU), a read only memory (ROM), a random access memory (RAM), a flash memory, or the like, for example. In other words, for example, the electronic control unit 76 is a microcomputer that includes one or more processors and one or more computer storage devices (i.e., computer memory devices). The electronic control unit 76 is formed of one or more semiconductor chips that are mounted on a printed circuit board. The term "electronic control unit" as used herein refers to hardware that executes a software program, and does not include a human. Various functions of the electronic control unit 76 are implemented as the foregoing work together. The electric power from the battery 24 is supplied to the control unit 76.

As illustrated in FIG. 3, the electronic control unit 76 includes a drive controller 76a and a switching controller 76b. That is, the driving device 70 includes the drive controller 76a and the switching controller 76b. In the present embodiment, the drive controller 76a and the switching controller 76b are implemented by the single electronic control unit 76. In other words, the drive controller 76a and the switching controller 76b are illustrated as separate processors in a single housing. However, the drive controller 76a and the switching controller 76b can be a single processor of the electronic control unit 76. In any case, the terms "drive controller" and "switching controller" as used herein refers to hardware that executes a software program, and does not include a human.

The drive controller 76a controls the electric motor 71a based on the control signal from the signal generator 74. The drive controller 76a outputs an electric-motor control signal to the electric motor 71a based on the control signal from the signal generator 74. The drive controller 76a changes the electric-motor control signal in response to the control signal from the signal generator 74. As the drive controller 76a drives the electric motor 71a, the hydraulic pressure is supplied to the movable member 66 via the flow path 64, thereby moving the movable member 66.

The switching controller 76b is configured to control the electric actuator 78. The switching controller 76b stores therein a prescribed threshold. The prescribed threshold can be changed by a user or can be varied in response to a riding parameter or a riding condition. The switching controller 76b detects electric power that can be supplied to the electric motor 71a from the battery 24. The switching controller 76b controls the electric actuator 78 based on a result of comparison between the electric power supplied to the electric motor 71a and the prescribed threshold. When the electric power supplied to the electric motor 71a is greater than or equal to the prescribed threshold, the switching controller 76b controls the electric actuator 78 such that the power from the operating portion 42 is transmitted to the additional transmission 75. With this control, the moving member 78a of the electric actuator 78 moves to the first position.

Accordingly, the driving device 70 goes into the first state of driving the movable member 66 by the power of the electric motor 71*a*.

When the electric power supplied to the electric motor 71*a* is lower than the prescribed threshold, the switching controller 76*b* controls the electric actuator 78 such that the power from the operating portion 42 is transmitted to the transmission 72. With this control, the moving member 78*a* of the electric actuator 78 moves to the second position. Accordingly, the driving device 70 goes into the second state of driving the movable member 66 by the power from the operating portion 42. In the present embodiment, the operated device 60 includes the movable members 66 including two friction members 66*b*. The flow path 64 is formed so that the power (hydraulic pressure) is supplied to each of the two friction members 66*b*. Of the two friction members 66*b*, one may be omitted, or may be fixed to the base portion 62.

That is, in a state in which the electric power is normally supplied to the electric motor 71*a* from the battery 24, the movable member 66 is driven by the electric motor 71*a*. Meanwhile, in a state in which electric power is not possible to supply normally the electric power to the electric motor 71*a* from the battery 24 (a state in which abnormality, including running out of battery, has occurred in a power supply system), the movable member 66 is driven by the power from the operating portion 42. Thus, it is possible to brake the small vehicle 10, regardless of the state of power supply to the driving device 70.

The housing 77 supports the various components of the driving device 70. The transmission 72, the additional transmission 75, and the switching mechanism 73 are provided in the housing 77. In the present embodiment, the electric drive mechanism 71, the transmission 72, the switching mechanism 73, the signal generator 74, the additional transmission 75, and the control unit 76 are provided in the housing 77. In the present embodiment, the housing 77 is provided integrally with the base portion 62.

The additional operating device 40B is an operating device of an electric brake. The additional operating device 40B, as with the operating device 40A, includes an operating portion pivotable around a pivot axis. The additional operating device 40B includes a detector that converts, into an electric signal, the input to the operating portion of the additional operating device 40B. The detector of the additional operating device 40B outputs an electric signal to the additional driving device 90.

Figure 5:
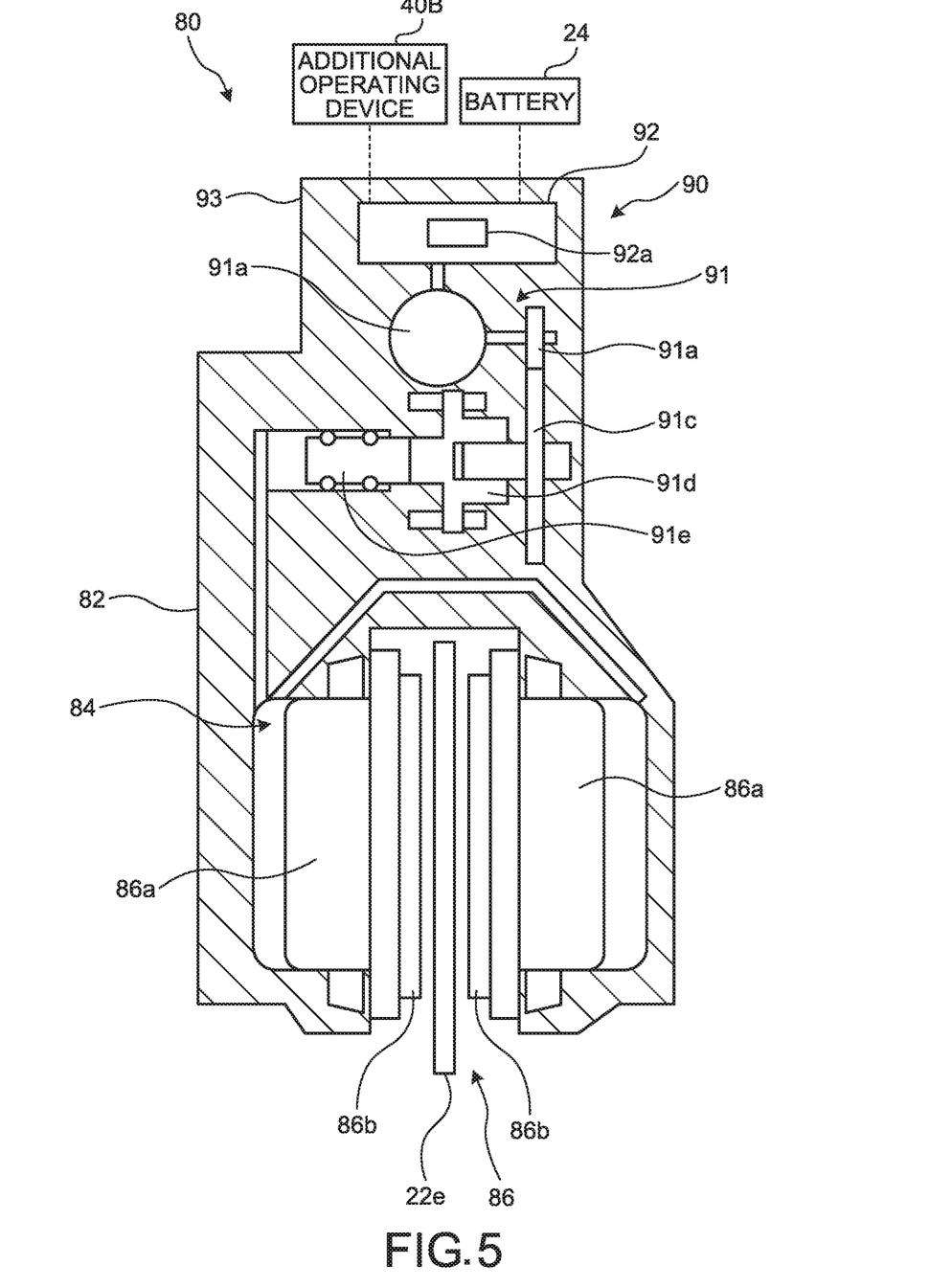
FIG. 5 is a schematic cross-sectional view of the additional operated device that is operated by an additional operated device in accordance with the illustrated embodiment.

As illustrated in FIG. 1, the additional operated device 80 is arranged at a position different from a position of the operated device 60 in the small vehicle 10, and is driven only by electric power. The additional operated device 80 is operated in accordance with the input to the additional operating device 40B. The additional operated device 80 is provided corresponding to the rear wheel 22 of the small vehicle 10. As illustrated in FIG. 5, the additional operated device 80 includes a base portion 82, a flow path 84, and a movable member 86. The base portion 82 is provided on the seat stay 12*e*. The flow path 84 is provided in the base portion 82. The movable member 86 includes pistons 86*a* and friction members 86*b*. The pistons 86*a* are movably provided with respect to the base portion 82. The friction members 86*b* are brake pads. The friction members 86*b* are movably supported on the base portion 82 via pad a nonillustrated pad pin so as to move with the movement of the pistons 86*a*.

As illustrated in FIG. 5, the additional driving device 90 includes an electric drive mechanism 91, an electronic control unit 92, and a housing 93. The electric drive mechanism 91 includes an electric motor 91*a*, a gear 91*b*, a gear 91*c*, a ball screw 91*d*, and a piston 91*e*. The electric motor 91*a* is configured to drive a movable member (disc rotor 22*e*). The electric motor 91*a* includes a case that is provided in the housing 93, a stator that is provided in the case, and a rotor that rotates with respect to the stator, for example. The electric power from the electronic control unit 92 is supplied to the electric motor 91*a*. The gear 91*b* is connected to the rotor of the electric motor 91*a*. The gear 91*c* meshes with the gear 91*b*. The ball screw 91*d* includes a screw shaft connected to the gear 91*c*, and a nut that meshes with the screw shaft. The piston 91*e* is connected to the nut of the ball screw 91*d*. The power of the electric motor 91*a* is transmitted to the ball screw 91*d* via the gear 91*b* and the gear 91*c*. When the screw shaft is rotated, the nut and the piston 91*e* move in the shaft direction.

The electronic control unit 92 is a computer, and includes a CPU, an ECU, a ROM, a RAM, a flash memory, or the like, for example. Various functions of the electronic control unit 92 are implemented as the foregoing work together. In other words, for example, the electronic control unit 92 is a microcomputer that includes one or more processors and one or more computer storage devices (i.e., computer memory devices). The electronic control unit 92 is formed of one or more semiconductor chips that are mounted on a printed circuit board. The electric power from the battery 24 is supplied to the electronic control unit 92. As illustrated in FIG. 5, the electronic control unit 92 includes a drive controller 92*a*.

The drive controller 92*a* controls the electric motor 91*a* based on the electrical signal from the additional operating device 40B. The drive controller 92*a* outputs an electric-motor control signal to the electric motor 91*a* based on a control signal from the additional operating device 40B. The drive controller 92*a* changes the electric-motor control signal in response to the control signal from the additional operating device 40B. As the drive controller 92*a* drives the electric motor 91*a*, the hydraulic pressure is supplied to the movable member 86 via the flow path 84, thereby moving the movable member 86.

The driving device 70 can be provided in the operating device 40A. The driving device 70 is provided in either one of the operating device 40A and the operated device 60. The additional driving device 90 can be provided in the additional operating device 40B. The additional driving device 90 is provided in either one of the additional operating device 40B and the additional operated device 80.

The drive controller 76*a* and the switching controller 76*b* do not need to be implemented by the electronic control unit 76. The drive controller 76*a* and the switching controller 76*b* can be provided as separate devices.

The driving system 30 can be configured such that the movable member 66 is driven manually in a normal state, and can be configured such that the movable member 66 is driven electrically in an abnormal state.

In the signal generator 74, any desired sensor other than a pressure sensor can be applied. The signal generator 74 is not particularly limited as long as it detects information on the power such as pressure or a flow rate.

The power generation mechanism 26 can directly supply the generated electric power to other components of the small vehicle 10 including the driving system 30. The electronic control unit 76 can acquire the electric power from the power generation mechanism 26. Alternatively, the electronic control unit 76 can acquire the electric power from both the battery 24 and the power generation mechanism 26. In the small vehicle 10, either one of the battery 24 and the power generation mechanism 26 can be omitted.

While the disc brake caliper that brakes the disc rotor 20e (the disc rotor 22e) has been described as the operated device 60 (the additional operated device 80) in the present embodiment, the operated device is not limited thereto. A rim brake configured to nip the rim 20a (rim 22a) by the friction members may be used as the operated device.

Modification

Figure 6:
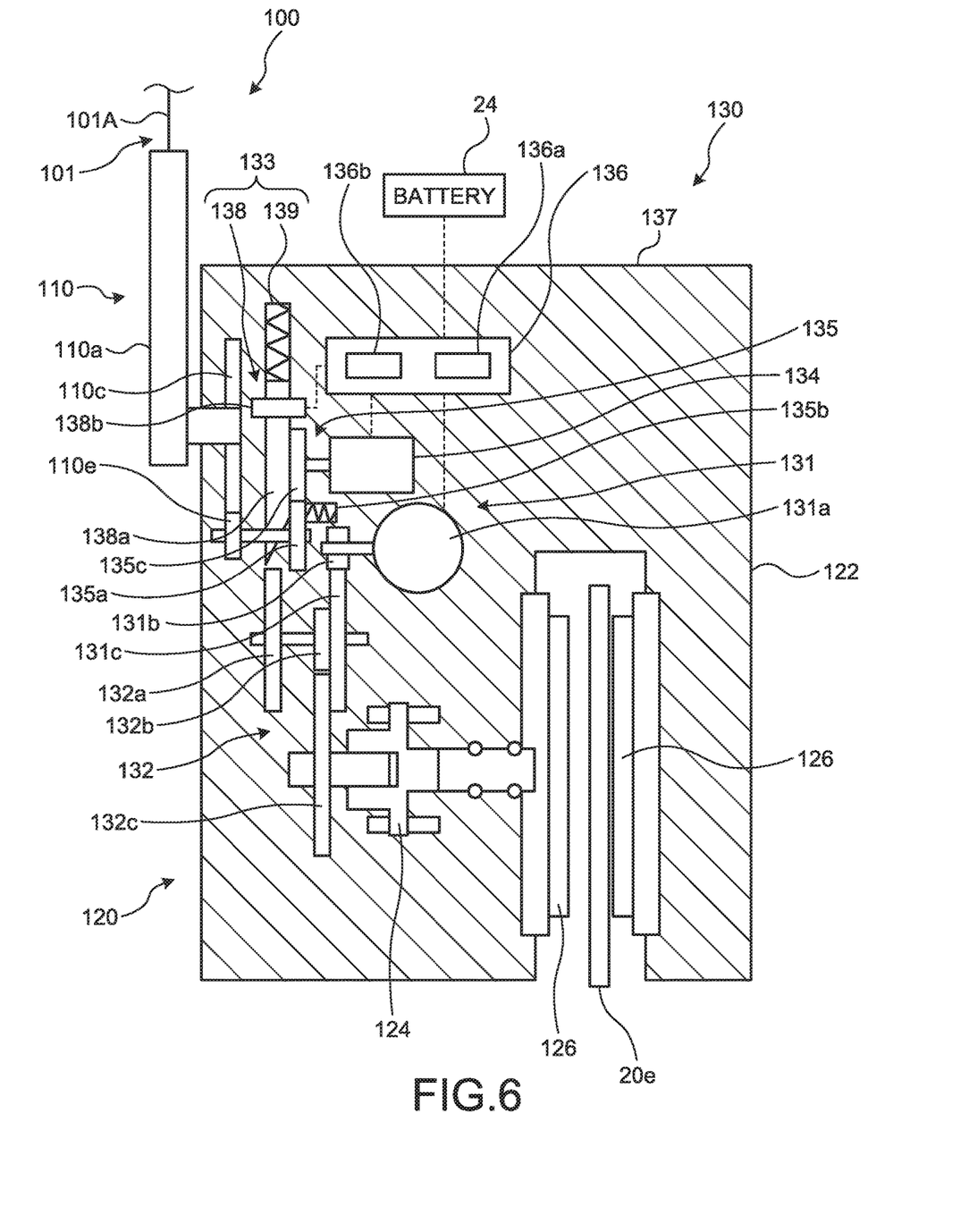
FIG. 6 is a schematic cross-sectional view of an operated device in accordance with a modification.

As illustrated in FIG. 6, a driving system 100 according to a modification includes a connecting member 101, a transmission mechanism 110, an operated device 120, and a driving device 130. Note that the configurations the same as those in the above-described embodiment are given the same reference signs and the redundant explanations thereof are omitted.

The connecting member 101 is configured to connect the operating device 40A and the operated device 120 to each other. In the present embodiment, the connecting member 101 is a Bowden cable, and includes an inner wire 101A, and an outer casing (not illustrated) that covers the inner wire 101A. The inner wire 101A of the connecting member 101 transmits, to the transmission mechanism 110, the input to the operating device 40A as a tensile force.

As illustrated in FIG. 6, the transmission mechanism 110 includes a rotary member 110a, a gear 110c, and a gear 110e. The rotary member 110a converts the tensile force of the connecting member 101 into rotation. The gear 110c is connected to the rotary member 110a and is rotated by the rotary member 110a. The gear 110e meshes with the gear 110c.

The operated device 120 is operated in accordance with the input to the operating portion 42. The operated device 120 is provided corresponding to the front wheel 20 of the small vehicle 10. As illustrated in FIG. 6, the operated device 120 includes a base portion 122, a ball screw 124, and two friction members 126. The base portion 122 is provided on the fork 16. One of the friction members 126 is movably provided with respect to the base portion 122. This friction member 126 is equivalent to a movable member. In the following description, the movable member means this friction member 126. The other of the friction members is fixed to the base portion 122. The ball screw 124 includes a screw shaft connected to a gear 132c, and a nut that meshes with the screw shaft. The movable member is connected to the nut of the ball screw 124. The movable member is a brake pad. The movable member is movably supported on the base portion 122 via a not-illustrated pad pin.

The driving device 130 is for use in the small vehicle 10 including a bicycle. As illustrated in FIG. 6, the driving device 130 includes an electric drive mechanism 131, a transmission 132, a switching mechanism 133, a signal generator 134, an additional transmission 135, an electronic control unit 136, and a housing 137.

As illustrated in FIG. 6, the electric drive mechanism 131 includes an electric motor 131a, a gear 131b, and a gear 131c. The electric motor 131a is configured to drive the movable member. The electric motor 131a includes a case that is provided in the housing 137, a stator that is provided in the case, and a rotor that rotates with respect to the stator, for example. The electric power from the battery 24 is supplied to the electric motor 131a. The gear 131b is connected to the rotor of the electric motor 131a. The gear 131c meshes with the gear 131b. The power of the electric motor 131a is transmitted to the transmission 132 via the gear 131b and the gear 131c.

The transmission 132 is configured to transmit the power from the operating portion 42 to the movable member. As illustrated in FIG. 6, the transmission 132 includes at least one gear. The transmission 132 includes a gear 132a, a gear 132b, and the gear 132c. The gear 132a, the gear 132b, and the gear 132c rotate together. The gear 132a and the gear 132b are arranged to be displaced in the shaft direction (arranged coaxially). The gear 132c meshes with the gear 132b. The gear 132c is connected to the screw shaft of the ball screw 124, and rotates the screw shaft. The power from the electric drive mechanism 131 is transmitted to the movable member via the transmission 132.

The switching mechanism 133 switches the state of the driving device 130 between a first state in which the movable member is driven by the power of the electric motor 131a and a second state in which the movable member is driven by the power from the operating portion 42. The switching mechanism 133 is configured to selectively transmit the power from the operating portion 42 to either one of the transmission 132 and the additional transmission 135. As illustrated in FIG. 6, the switching mechanism 133 includes an electric actuator 138 and a biasing member 139.

Figure 7:
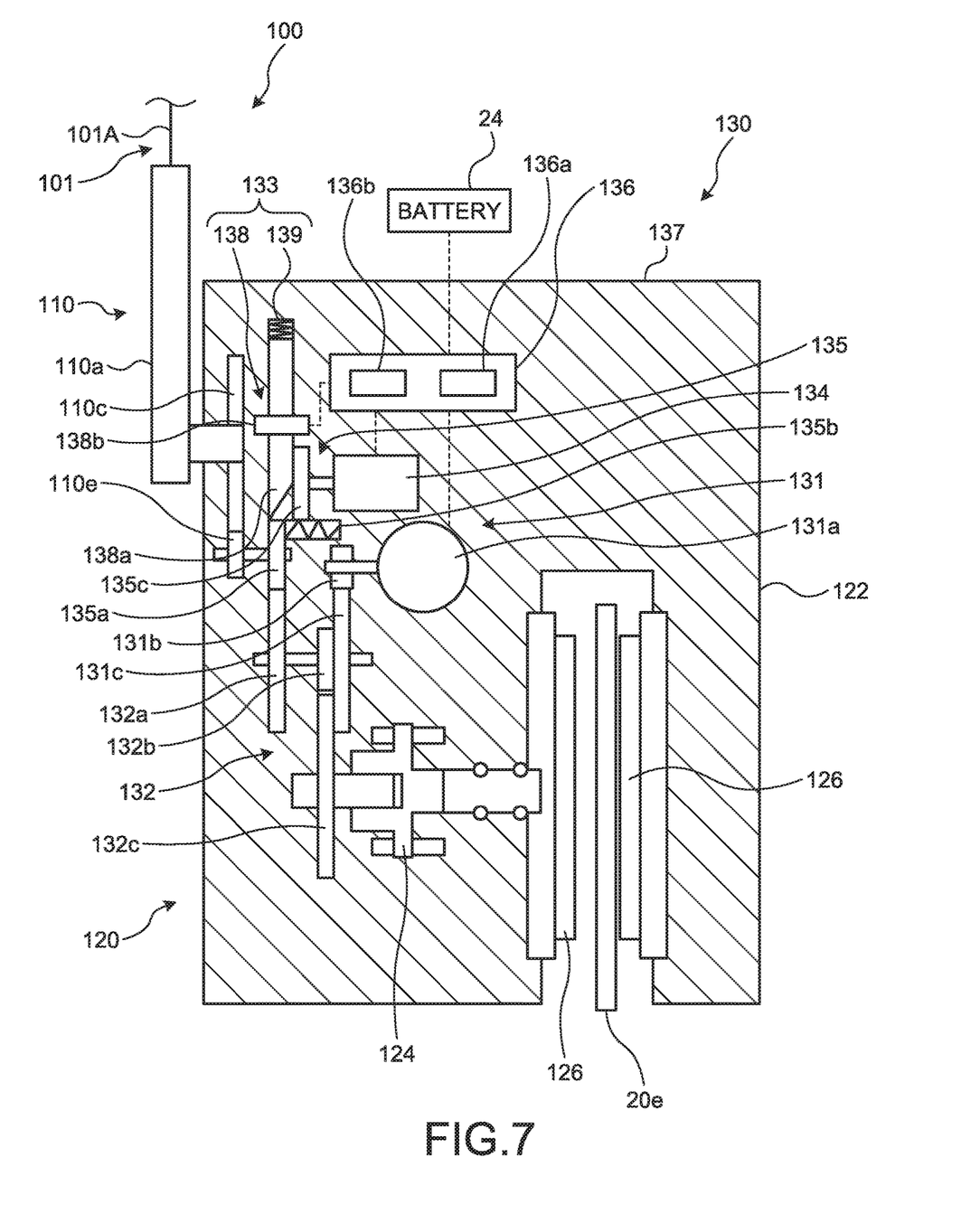
FIG. 7 is a schematic cross-sectional view of the operated device in accordance with the modification.

As illustrated in FIG. 6, the electric actuator 138 includes a moving member 138a and a drive portion 138b. The moving member 138a moves between a first position corresponding to the first state and a second position corresponding to the second state. The moving member 138a is fitted in a space provided in the housing 137, and is movably provided with respect to the housing 137. In FIG. 6, the moving member 138a is at the first position. As illustrated in FIG. 6, when the moving member 138a is at the first position, the connecting member 101 and the additional transmission 135 are connected. In FIG. 7, the moving member 138a is at the second position. As illustrated in FIG. 7, when the moving member 138a is at the second position, the connecting member 101 and the transmission 132 are connected, and the tensile force from the operating portion 42 is transmitted to the transmission 132 and eventually to the movable member. The electric actuator 138 is configured to cause the moving member 138a to move from the second position to the first position with the supply of electric power. The drive portion 138b is configured to cause the moving member 138a to move from the second position to the first position with the supply of electric power. The drive portion 138b is a solenoid, for example. The biasing member 139 biases the moving member 138a toward the second position. The biasing member 139 is a coil spring, for example. One end of the biasing member 139 is supported on the housing 137. The other end of the biasing member 139 is in contact with the moving member 138a and pushes the moving member 138a.

The signal generator 134 generates a control signal based on the power from the operating portion 42. The signal generator 134 is a pressure sensor, for example. The additional transmission 135 is configured to transmit the power from the operating portion 42 to the signal generator 134. The additional transmission 135 includes at least one gear. The additional transmission 135 includes a gear 135a, a biasing member 135b, and a gear 135c. The gear 135a is arranged to be displaced in the shaft direction (arranged coaxially) with respect to the gear 110e. The gear 135a is movably provided in the shaft direction. The biasing member 135b is a coil spring, for example. One end of the biasing member 135b is supported on the housing 137. The other end of the biasing member 135b is in contact with the gear 135a and pushes the gear 135a. The gear 135c meshes with the gear 135a. The rotation of the gear 135c is input to the signal generator 134. The signal generator 134 changes the control signal to be generated in response to the changes in a turning force transmitted from the additional transmission 135. The signal generator 134 outputs the generated control signal to the electronic control unit 136.

The electronic control unit 136 is a computer, and includes a CPU, an ECU, a ROM, a RAM, a flash memory, or the like, for example. Various functions of the control unit 136 are implemented as the foregoing work together. In other words, for example, the electronic control unit 136 is a microcomputer that includes one or more processors and one or more computer storage devices (i.e., computer memory devices). The electronic control unit 136 is formed of one or more semiconductor chips that are mounted on a printed circuit board. The electric power from the battery 24 is supplied to the electronic control unit 136.

As illustrated in FIG. 6, the electronic control unit 136 includes a drive controller 136a and a switching controller 136b. That is, the driving device 130 includes the drive controller 136a and the switching controller 136b. In the modification, the drive controller 136a and the switching controller 136b are implemented by the single electronic control unit 136. In other words, the drive controller 136a and the switching controller 136b are illustrated as separate processors in a single housing. However, the drive controller 136a and the switching controller 136b can be a single processor of the electronic control unit 136.

The drive controller 136a controls the electric motor 131a based on the control signal from the signal generator 134. The drive controller 136a outputs an electric-motor control signal to the electric motor 131a based on the control signal from the signal generator 134. The drive controller 136a changes the electric-motor control signal in response to the control signal from the signal generator 134. As the drive controller 136a drives the electric motor 131a, the gears of the transmission 132 are driven, thereby moving the movable member.

The switching controller 136b is configured to control the electric actuator 138. The switching controller 136b stores therein a prescribed threshold. The switching controller 136b detects electric power that can be supplied to the electric motor 131a from the battery 24. The switching controller 136b controls the electric actuator 138 based on a result of comparison between the electric power supplied to the electric motor 131a and the prescribed threshold. When the supplied electric power is greater than or equal to the prescribed threshold, the switching controller 136b controls the electric actuator 138 such that the power from the operating portion 42 is transmitted to the additional transmission 135. With this control, the moving member 138a of the electric actuator 138 moves to the first position. In this case, the moving member 138a moves the gear 135a in the direction closer to the gear 135c. It is desirable that the moving member 138a be provided with a tapered portion at the distal end so as to make it easier to move the gear 135a. Because the gear 135a meshes with the gear 135c, the rotation of the gear 110e is transmitted to the signal generator 134. Accordingly, the driving device 130 goes into the first state of driving the movable member by the power of the electric motor 131a.

When the electric power supplied to the electric motor 131a is lower than the prescribed threshold, the switching controller 136b controls the electric actuator 138 such that the power from the operating portion 42 is transmitted to the transmission 132. With this control, the moving member 138a of the electric actuator 138 moves to the second position. In this case, the gear 135a is pushed by the biasing member 135b and is moved in the direction away from the gear 135c. Because the gear 135a meshes with the gear 132a, the rotation of the gear 110e is transmitted to the transmission 132. Accordingly, the driving device 130 goes into the second state of driving the movable member by the power from the operating portion 42.

The housing 137 supports the various components of the driving device 130. The transmission 132, the additional transmission 135, and the switching mechanism 133 are provided in the housing 137. In the modification, the electric drive mechanism 131, the transmission 132, the switching mechanism 133, the signal generator 134, the additional transmission 135, and the electronic control unit 136 are provided in the housing 137. In the modification, the housing 137 is provided integrally with the base portion 122.

While a certain embodiment and modification of the present invention have been described, the description thereof is not intended to limit the embodiment. The constituting elements described herein include elements easily achieved by one skilled in the art, elements being substantially the same as the constituting elements, and elements within the scope of equivalents of the constituting elements. The constituting elements described herein may be combined in an appropriate manner. Furthermore, various omissions, substitutions and changes in the constituting elements may be made without departing from the spirit of the embodiment.

What is claimed is:

1. A driving device for use in a small vehicle including a bicycle, the driving device comprising:
   an electric drive mechanism including an electric motor that is configured to drive a movable member;
   a transmission configured to transmit power from an operating portion to the movable member; and
   a switching mechanism configured to sequentially switch a state of the driving device between a first state and a second state, the first state being a state in which the movable member is driven by power of the electric motor in response to an input to the operating portion and the second state being a state in which the movable member is driven by power from the operating portion in response to the input to the operating portion.

2. The driving device according to claim 1, wherein the transmission operatively couples the electric drive mechanism to the movable member to transmit the power from the electric drive mechanism to the movable member via the transmission.

3. A driving system including the driving device according to claim 1, and comprising:
   an operating device including the operating portion;
   an operated device configured to be operated in accordance with the input to the operating portion, the operated device including the movable member; and
   the driving device being provided in either one of the operating device and the operated device.

4. The driving system according to claim 3, further comprising
   an additional operated device arranged at a position different from a position of the operated device in the small vehicle and driven only by electric power.

5. The driving system according to claim 4, wherein the operated device is provided corresponding to a front wheel of the small vehicle, and the additional operated device is provided corresponding to a rear wheel of the small vehicle.

6. The driving device according to claim 1, further comprising:
   a signal generator configured to generate a control signal for controlling the electric drive mechanism,
   the switching mechanism including an electric actuator configured to move between a first position to achieve the first state and a second position to achieve the second state,
   the first state being a state in which the power from the operating portion is directed to the signal generator and the second state being a state in which the power from the operating portion is directed through the transmission to drive the movable member.

7. The driving device according to claim 1, wherein
   in the first state, the power from the operation portion is not transmitted to the movable member.

8. The driving device according to claim 1, wherein
   the input to the operating portion is a movement of the operating portion from a standby position to an operated position.

9. A driving device for use in a small vehicle including a bicycle, the driving device comprising:
   an electric drive mechanism including an electric motor that is configured to drive a movable member;
   a transmission configured to transmit power from an operating portion to the movable member;
   a switching mechanism configured to sequentially switch a state of the driving device between a first state in which the movable member is driven by power of the electric motor and a second state in which the movable member is driven by power from the operating portion;
   a signal generator configured to generate a control signal based on the power from the operating portion;
   an additional transmission configured to transmit the power from the operating portion to the signal generator; and
   a drive controller configured to control the electric motor based on the control signal,
   the switching mechanism being configured to selectively transmit the power from the operating portion to either one of the transmission and the additional transmission.

10. The driving device according to claim 9, wherein
    the switching mechanism includes an electric actuator, and
    the driving device further comprises a switching controller configured to control the electric actuator.

11. The driving device according to claim 10, wherein
    the switching controller is configured to control the electric actuator based on a result of comparison between electric power supplied to the electric motor and a prescribed threshold.

12. The driving device according to claim 11, wherein
    the switching controller is configured to control the electric actuator such that the power from the operating portion is transmitted to the additional transmission upon determining the electric power supplied to the electric motor is greater than or equal to the prescribed threshold.

13. The driving device according to claim 12, wherein
    the switching controller is configured to control the electric actuator such that the power from the operating portion is transmitted to the transmission upon determining the electric power supplied to the electric motor is lower than the prescribed threshold.

14. The driving device according to claim 13, wherein
    the electric actuator includes a moving member configured to move between a first position corresponding to the first state and a second position corresponding to the second state.

15. The driving device according to claim 14, wherein
    the electric actuator is configured to move the moving member from the second position to the first position in accordance with supply of the electric power.

16. The driving device according to claim 14, wherein
    the switching mechanism further includes a biasing member configured to bias the moving member toward the second position.

17. The driving device according to claim 9, wherein
    the transmission includes a flow path through which hydraulic pressure is transmitted, and
    the additional transmission includes an additional flow path through which hydraulic pressure is transmitted.

18. The driving device according to claim 9, wherein
    the transmission includes at least one gear, and
    the additional transmission includes at least one gear.

19. The driving device according to claim 9, further comprising
    a housing in which the transmission, the additional transmission, and the switching mechanism are provided.

* * * * *